United States Patent
Maruyama (10) Patent No.: US 11,223,209 B2
(45) Date of Patent: Jan. 11, 2022

(54) CONTROL DEVICE FOR DISTRIBUTED POWER SUPPLY SYSTEM, DISTRIBUTED POWER SUPPLY SYSTEM, AND CONTROL PROGRAM OF DISTRIBUTED POWER SUPPLY SYSTEM

(71) Applicant: MITSUBISHI HEAVY INDUSTRIES, LTD., Tokyo (JP)

(72) Inventor: Masanori Maruyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 140 days.

(21) Appl. No.: 16/104,489

(22) Filed: Aug. 17, 2018

(65) Prior Publication Data
US 2019/0067949 A1 Feb. 28, 2019

(30) Foreign Application Priority Data

Aug. 24, 2017 (JP) .............................. JP2017-161270

(51) Int. Cl.
*H02J 3/00* (2006.01)
*H02J 3/38* (2006.01)
(Continued)

(52) U.S. Cl.
CPC ............... *H02J 3/386* (2013.01); *H02J 3/34* (2013.01); *H02J 3/36* (2013.01); *H02M 7/06* (2013.01); *H02M 7/08* (2013.01)

(58) Field of Classification Search
CPC ............................... H02J 3/00; H02J 2300/00
(Continued)

(56) References Cited

U.S. PATENT DOCUMENTS

2010/0127571 A1* 5/2010 Hadar ...................... H02J 3/46
307/77
2011/0025130 A1* 2/2011 Hadar ............... H01L 31/02021
307/80
(Continued)

FOREIGN PATENT DOCUMENTS

EP 3 116 089 1/2017
JP 56-166784 12/1981
(Continued)

OTHER PUBLICATIONS

Notice of Reasons for Refusal dated Dec. 3, 2019 in corresponding Japanese Patent Application No. 2017-161270, with English-language translation.
(Continued)

*Primary Examiner* — Hal Kaplan
*Assistant Examiner* — Joseph N Inge
(74) *Attorney, Agent, or Firm* — Wenderoth, Lind & Ponack, L.L.P.

(57) ABSTRACT

A distributed power supply system includes a plurality of power supply groups having at least one wind turbine generator; and a rectifier which is provided corresponding to each of the power supply groups, and configured to rectify AC power to DC power, so that the DC power rectified by the rectifier is collected to transmit electric power. A control device for the distributed power supply system comprises a grouping section configured to group the power supply groups into at least two groups; a phase command generation section configured to generate phase commands different from one another for each group to output to the power supply groups belonging to the respective groups, and generate the same phase command to output to the wind turbine generators belonging to the same group; and a
(Continued)

transmission section configured to transmit the same phase command to the wind turbine generators.

10 Claims, 6 Drawing Sheets

(51) Int. Cl.
    *H02J 3/36*     (2006.01)
    *H02J 3/34*     (2006.01)
    *H02M 7/06*     (2006.01)
    *H02M 7/08*     (2006.01)

(58) Field of Classification Search
    USPC .......................................................... 307/82
    See application file for complete search history.

(56) References Cited

U.S. PATENT DOCUMENTS

| | | | |
|---|---|---|---|
| 2011/0133563 A1 | 6/2011 | Barton et al. | |
| 2013/0127257 A1* | 5/2013 | Yamamoto | H02J 4/00 307/104 |
| 2015/0256094 A1* | 9/2015 | Chaudhuri | H02M 5/4585 363/35 |
| 2016/0013653 A1 | 1/2016 | Dorn et al. | |
| 2016/0254668 A1 | 9/2016 | Huang et al. | |
| 2017/0005478 A1 | 1/2017 | Dorn et al. | |
| 2017/0005479 A1 | 1/2017 | Eckel et al. | |
| 2017/0009738 A1 | 1/2017 | Brogan et al. | |

FOREIGN PATENT DOCUMENTS

| | | | |
|---|---|---|---|
| JP | 2003-61360 | 2/2003 | |
| JP | 2003-259650 | 9/2003 | |
| JP | 2008-67433 | 3/2008 | |
| JP | 2012-222999 | 11/2012 | |
| JP | 2016-510203 | 4/2016 | |
| JP | 2017-22985 | 1/2017 | |
| JP | 2017-501672 | 1/2017 | |
| WO | 2010/049027 | 5/2010 | |
| WO | 2011/033308 | 3/2011 | |
| WO | 2011/092302 | 8/2011 | |
| WO | 2014/055333 | 4/2014 | |
| WO | 2014/131454 | 9/2014 | |
| WO | 2014/131457 | 9/2014 | |
| WO | 2015/051817 | 4/2015 | |
| WO | 2015/090465 | 6/2015 | |
| WO | 2015/165517 | 11/2015 | |
| WO | WO-2015165517 A1 * | 11/2015 | ............. F03D 9/255 |
| WO | 2016/066188 | 5/2016 | |

OTHER PUBLICATIONS

Extended European Search Report dated Nov. 7, 2018 in corresponding European Application No. 18189687.9.

* cited by examiner

CONTROL DEVICE FOR DISTRIBUTED POWER SUPPLY SYSTEM, DISTRIBUTED POWER SUPPLY SYSTEM, AND CONTROL PROGRAM OF DISTRIBUTED POWER SUPPLY SYSTEM

BACKGROUND OF THE INVENTION

1. Field of the Invention

The present invention relates to a control device for a distributed power supply system, the distributed power supply system, a control method for the distributed power supply system, and a control program of the distributed power supply system.

2. Description of Related Art

In recent years, large scale generation facilities such as a wind turbine generator, and a photovoltaic generator, which utilize natural energy are widely used from the viewpoint of global environment conservation. The wind turbine generating facility typically includes a wind farm including a plurality of wind turbine generators, and a transmission facility which transmits electric power generated by the wind farm to a power system. Particularly, the large scale wind turbine generating facility may be disposed offshore, i.e., at a position distant from the power system. For example, in an offshore wind turbine generating facility, the wind farm may be arranged several hundred kilometers from the power system.

In this case, when the transmission distance between the wind farm and a connecting point of the power system is large, the DC transmission with no reactive power is more advantageous than the AC transmission from the viewpoint of the transmission loss. Particularly, the DC transmission is appropriate when a long-haul submarine cable is used. In this case, in the AC transmission, the transmission loss tends to become large. In the submarine cable, a conductor is typically surrounded with an insulator and a relatively thin layer of a conductor sheath, in order to obtain the higher capacitance.

As the AC transmission, an AC transmission to the power system connected through a high voltage direct current (HVDC; High Voltage Direct Current) is known. In the HVDC system, when the electric power of an alternating current (AC) system is converted to the high voltage direct current, a separately excited or self-excited power converter is typically used. However, the power converter is very expensive, and a casing of the power converter is large.

To solve the above problems, PCT International Publication No. WO 2015/90465 (hereinafter referred to as "WO 2015/90465") discloses that the conversion from alternating current to direct current is performed at low cost by a rectifier, for example.

BRIEF SUMMARY OF THE INVENTION

However, in the invention disclosed in WO 2015/90465, the electric power of the AC system is converted to a direct current by a rectifier. Therefore, there has been a problem in that the ripple becomes larger as compared to the case where the power converter is used. This is because all of the AC systems connected to the wind turbine generators are operated in the same phase. A DC filter is used to reduce this ripple. However, there is a problem in that a size of the DC filter is also increased in proportion to the magnitude of the ripple.

The present invention has been made in view of such circumstances, and an object of the present invention is to provide a control device for a distributed power supply system which uses a rectifier and can reduce a ripple, the distributed power supply system, a control method for the distributed power supply system, and a control program of the distributed power supply system.

To solve the above-described problems, a control device for a distributed power supply system, the distributed power supply system, a control method for the distributed power supply system, and a control program of the distributed power supply system according to the present invention adopt the following means.

A control device of a distributed power supply system according to a first aspect of the present invention, the distributed power supply system including a plurality of power supply sets having at least one distributed power supply; and a rectifier which is provided corresponding to each of the power supply sets, and rectifies AC power of the distributed power supply to DC power, so that the DC power rectified by the rectifier is collected to transmit the electric power, comprises: a grouping device that groups the plurality of power supply sets into at least two groups; a phase command generation device that generates phase commands different from one another for each group to output to the power supply sets belonging to the respective groups, and generates the same phase command to output to the distributed power supplies in the power supply sets belonging to the same group; and a transmission device that transmits the phase command generated by the phase command generation device to the distributed power supplies of the power supply sets.

According to the present aspect, the grouping device groups the plurality of power supply sets having at least one distributed power supply into at least two groups, and the phase command generation device generates phase commands different from one another for each group. The phase command generation device generates the same phase command to output to the power supply sets belonging to the same group, and the transmission device transmits the phase command to the distributed power supplies in the power supply sets.

Ripples of high voltage direct current sides of the rectifiers cancel each other out. According to the present aspect, when the grouping device groups the power supply sets into two groups, for example, it is possible to obtain the higher harmonic reduction effect which is equivalent to that in case of using a rectifier the number of pulses of which is twice the number of pulses of the rectifier used in the present aspect. According to the present aspect, the capacity of the DC filter can be reduced even when it is necessary to use the large DC filter to reduce the ripple. As the number of pulses of the rectifier is increased, the rectifier becomes typically more expensive, and the combination with the voltage converter is also complicated. According to the present aspect, making the phase difference by providing phase commands different from one another enables the effect which is equivalent to that of the rectifier with large number of pulses to be obtained at low cost without replacing the rectifier.

The rectifier is used without using a self-excited or separately excited power converter such as a transistor, thereby achieving the inexpensive power transmission. Particularly, a significant effect is achieved in the long distance transmission which advantageously enables the power transmission in a high voltage DC system. Using the rectifier may cause an increase in the size of the DC filter for reducing the ripple. According to the present aspect, the ripples cancel each other out, thereby allowing the capacity and cost of the DC filter to be reduced.

In the above-described first aspect, the transmission device transmits a frequency setting command to the distributed power supply so that the distributed power supply is operated at a frequency higher than a commercial frequency.

The capacity of the DC filter depends on the ripple frequency. According to the present aspect, the transmission device transmits the frequency setting command so that a frequency of the AC power of the distributed power supply is set to a frequency (for example, 400 Hz) higher than 50 Hz, which is a general commercial frequency. The capacity of the DC filter decreases in inverse proportion to an increase in frequency of the ripple, thereby allowing the capacity of the DC filter to be further reduced.

In the above-described first aspect, the phase command generation device may generate the phase command based on the number of pulses of the rectifier and the number of groups.

The phase command generation device of the control device of the present aspect generates a phase command based on the pulse period in the rectifier and the number of power supply sets. In this way, the distributed power supply system may have a phase difference capable of obtaining the highest ripple reduction effect.

In the above-described first aspect, the grouping device may group the power supply sets to minimize the difference in total power outputs from the distributed power supplies between the groups.

In the distributed power supply system, when the total power output from the plurality of distributed power supplies in every group becomes equal to that from the plurality of distributed power supplies in each of the other groups, the higher harmonic components included in the high voltage direct current are minimized. In the present aspect, the grouping device groups the power supply sets so that a difference in total power outputs from the distributed power supplies between the groups is minimized.

According to the present aspect, the grouping device groups the power supply sets to minimize the higher harmonic components, thereby allowing the effect achieved by the phase difference to be maximized.

In the above-described first aspect, the grouping device may change the groups so that a difference in total power outputs from the distributed power supplies between the groups is minimized, when the total power output from the distributed power supplies for each group fluctuates.

According to the present aspect, the grouping device regroups the power supply groups to minimize the difference in total power outputs from the distributed power supplies between the groups when the total power output from the distributed power supplies for each group fluctuates. The total power outputs can be balanced between the groups, and the power transmission can be performed without impairing the effect achieved by the phase difference.

A distributed power supply system according to a second aspect of the present invention comprises: a plurality of power supply sets having at least one distributed power supply; and a rectifier configured to provided corresponding to each of the power supply sets and rectifies AC power of the distributed power supply to DC power; and the control device according to any one of the above-described items.

A control method for a distributed power supply system according to a third aspect of the present invention, the distributed power supply system including a plurality of power supply sets having at least one distributed power supply; and a rectifier which is provided corresponding to each of the power supply sets, and rectifies AC power of the distributed power supply to DC power, so that the DC power rectified by the rectifier is collected to transmit the electric power, comprises: a grouping step of grouping a plurality of power supply sets into at least two groups; a phase command generation step of generating phase commands different from one another for each group to output to the distributed power supplies in the power supply sets belonging to the respective groups, and generating the same phase command to output to the power supply sets belonging to the same group; and a transmission step of transmitting the phase command generated by the phase command generation step to the distributed power supplies of the power supply sets.

A control program of a distributed power supply system according to a fourth aspect of the present invention, the distributed power supply system including a plurality of power supply sets having at least one distributed power supply; and a rectifier which is provided corresponding to each of the power supply sets, and rectifies AC power of the distributed power supply to DC power, so that the DC power rectified by the rectifier is collected to transmit the electric power, comprises: a grouping step of grouping a plurality of power supply sets into at least two groups; a phase command generation step of generating phase commands different from one another for each group to output to the power supply sets belonging to the respective groups, and generating the same phase command to output to the distributed power supplies in the power supply sets belonging to the same group; and a transmission step of transmitting the phase command generated by the phase command generation step to the distributed power supplies of the power supply sets.

The present invention has an effect of reducing a ripple of a DC system.

DETAILED DESCRIPTION OF THE INVENTION

Hereinafter, a control device for a distributed power supply system, the distributed power supply system, a control method for the distributed power supply system, and a control program of the distributed power supply system according to each embodiment of the present invention will be described with reference to the drawings.

First Embodiment

Hereinafter, a first embodiment of the present invention will be described with reference to FIG. 1 to FIG. 6.

Figure 1:
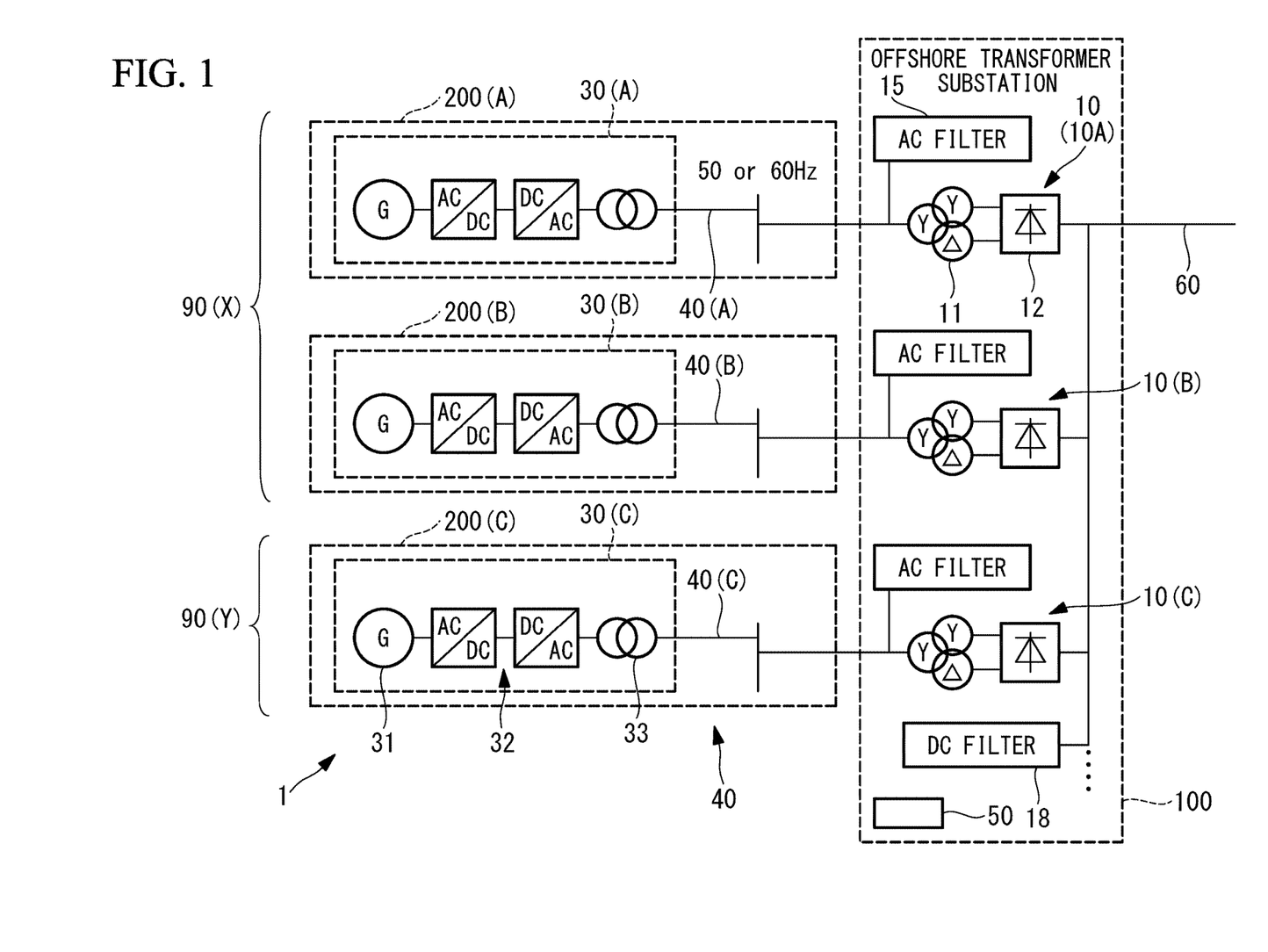
FIG. 1 is a schematic configuration diagram illustrating a distributed power supply system according to a first embodiment of the present invention.

FIG. 1 illustrates a schematic configuration of a distributed power supply system according to the present embodiment.

Figure 2:
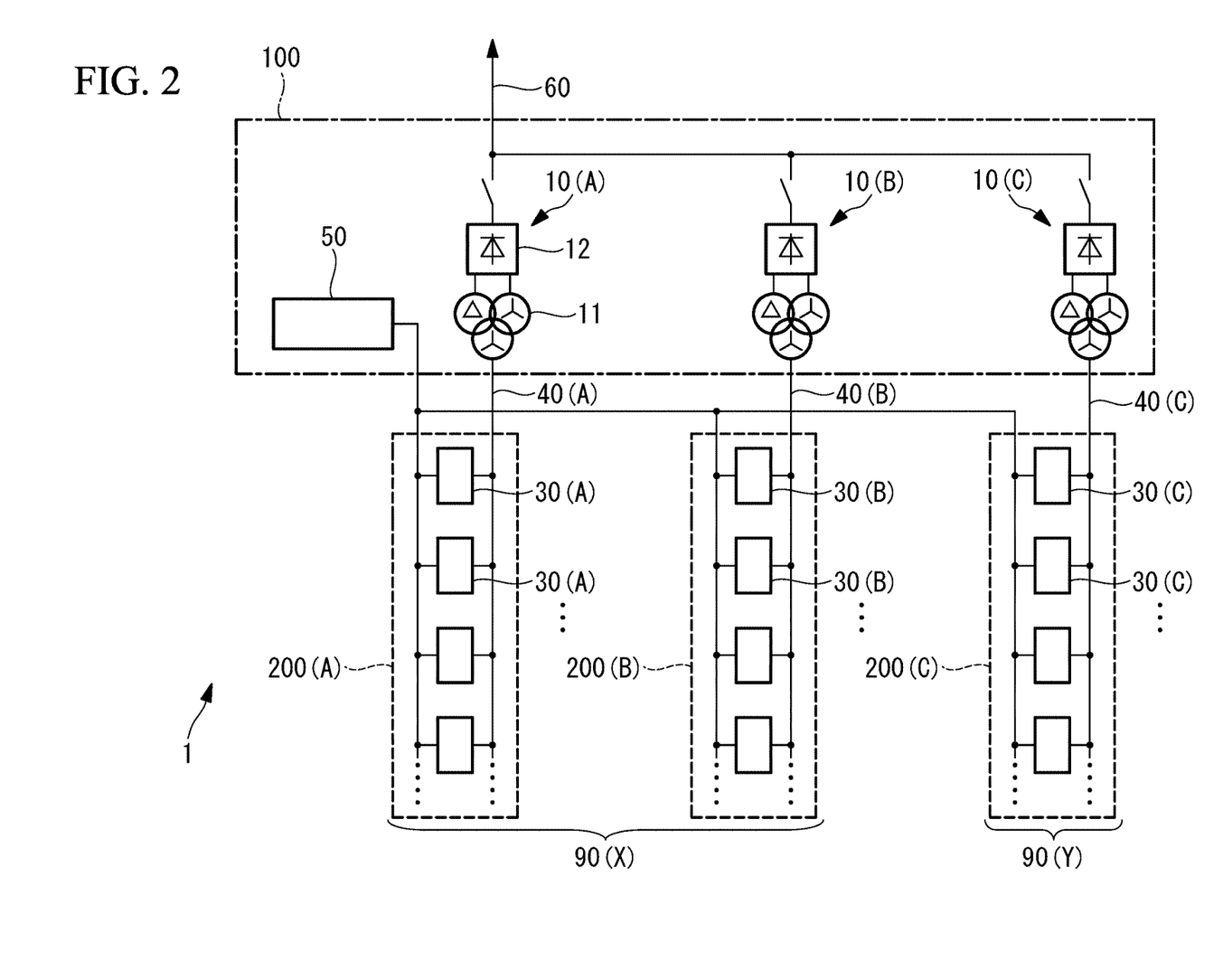
FIG. 2 is a diagram illustrating a wiring configuration of a control device of the distributed power supply system according to the first embodiment of the present invention.

FIG. 2 illustrates a wiring configuration of a control device of the distributed power supply system according to the present embodiment.

Figure 3:
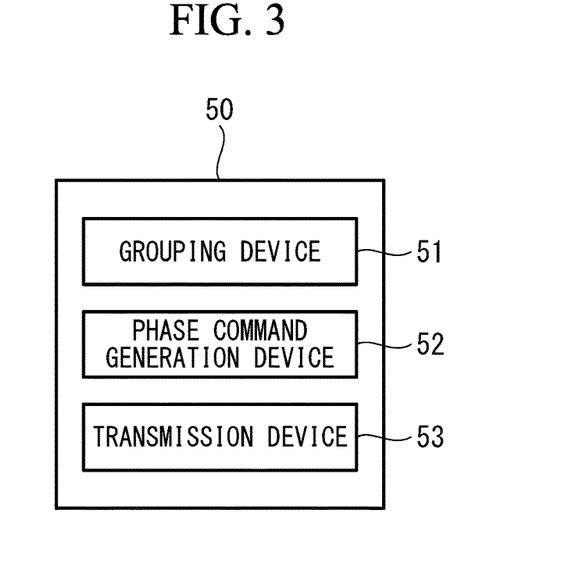
FIG. 3 is a functional block diagram of the control device of the distributed power supply system according to the first embodiment of the present invention.

FIG. 3 is a functional block diagram of the control device of the distributed power supply system according to the present embodiment.

As illustrated in FIG. 1, a distributed power supply system 1 includes, as main components, a plurality of power supply sets 200, AC power collecting systems 40 which are provided corresponding to the respective power supply sets 200, the AC power collecting systems 40 serving as an AC system, an offshore transformer substation 100, and a control device 50.

FIG. 1 illustrates, as an example, the case where three power supply sets 200A, 200B, and 200C are provided, but the number of power supply sets to be installed is not limited to three. In the following descriptions, when the power supply sets need not be distinguished, the power supply sets are simply denoted with reference numeral "200." When the power supply sets are distinguished from one another, the power supply sets are denoted with reference numerals "200A," "200B," and the like, respectively. Reference numerals regarding other configurations are also to be interpreted analogously.

Each of the power supply sets 200 includes at least one distributed power supply. When the power supply set group 200 includes a plurality of distributed power supplies, the distributed power supplies in the same power supply set group 200 are connected in parallel to one another.

In the present embodiment, the distributed power supply is a wind turbine generator 30, but the distributed power supply may be another distributed power supply such as a photovoltaic generator and a geothermal generator.

Each of the wind turbine generators 30 included in the power supply sets 200 is disposed offshore at a distance of a few hundred kilometers from a site on land where a power system (not illustrated) is installed, and includes a power generator 31 which converts rotational energy of a rotor rotating by receiving wind to electric power, a power converter 32 which converts the electric power generated by the power generator, and a transformer 33.

The electric power generated by each of the wind turbine generators 30 belonging to the common power supply sets 200 is collected by each of the AC power collecting systems 40A, 40B, and 40C which are provided corresponding to the power supply sets 200A, 200B, and 200C, respectively, and is introduced into each of rectifiers 10A, 10B, and 10C in the offshore transformer substation 100, the rectifiers 10A, 10B, and 10C corresponding to the AC power collecting systems 40A, 40B, and 40C, respectively. Voltage phases and current phases in the wind turbine generators 30 belonging to the same power supply set group 200 are controlled to be the same phases by the control device 50 as described later.

The offshore transformer substation 100 is a facility which converts the electric power supplied from the power supply sets 200 from AC power to DC power, and is disposed offshore in the vicinity of the wind turbine generators 30. As illustrated in FIG. 1, the offshore transformer substation 100 includes voltage converters 11, the rectifiers 10 each including a diode 12, AC filters 15, and a DC filter 18, so that each of the voltage converters 11, each of the rectifiers 10, each of the AC filters 15, and each of the DC filter 18 are provided for the corresponding power supply set group 200. Furthermore, the control device 50 is installed in the offshore transformer substation 100. The rectifiers 10 are arranged in parallel to one another to be connected with a DC system 60 described later. In the present embodiment, each of the rectifiers 10 is a 12-pulse rectifier which is connected to the voltage converter 11 having 12 conversion phases.

In the offshore transformer substation 100, the AC filter 15 removes noise of the AC power to be supplied to the rectifier 10 through the AC power collecting system 40, and corrects the phase when a phase lag or phase lead occurs due to use of a cable for the AC power collecting system 40. The voltage converter 11 convers the AC power supplied from the corresponding power supply set 200 to a voltage suitable for being supplied to the power system (not illustrated).

The AC power in which the noise has been removed and the phase has been corrected by the AC filter 15 and the voltage value has been adjusted by the voltage converter 11 is converted to the DC power by the rectifier 10. The converted DC power is output to the DC system 60, so that the DC power supplied from each of the power supply sets 200 is collected in the DC system 60 to be supplied to the power system (not illustrated).

At this time, the ripple included in the DC power converted by the rectifier 10 is reduced by the DC filter 18 which is provided in parallel to the rectifiers 10 to be connected to the DC system 60.

The above-described DC system 60 transmits the electric power converted from the AC power to the DC power by the offshore transformer substation 100 to the power system (not illustrated) such as a power system on a site on land. In the present embodiment, the DC system 60 is a high voltage direct current (HVDC; High Voltage Direct Current) system. The electric power is transmitted to the power system (not illustrated) in a bipolar system, and the current capacity is, for example, ±400 kV.

As illustrated in FIG. 3, the control device 50 includes a grouping section (grouping device) 51, a phase command generation section (phase command generation device) 52, and a transmission section (transmission device) 53.

The grouping section 51 groups the plurality of power supply sets 200 into at least two groups 90.

The phase command generation section 52 generates phase commands different from one another to output to the power supply sets 200 belonging to the respective groups 90, and generates the same phase command to output to the wind turbine generators 30 in the power supply sets 200 belonging to the same group 90.

The transmission section 53 transmits the phase command generated by the phase command generation section 52 to the wind turbine generator 30 in the power supply set 200.

The control device 50 includes a CPU (Central Processing Unit), a RAM (Random Access Memory), a ROM (Read Only Memory), a non-transitory computer readable memory medium, and the like, for example. By way of example, a series of processing for implementing various functions is stored in the memory medium or the like in a form of a program, the CPU reads out this program in the RAM or the like, and performs processing and computation of information, thereby implementing the various functions. Note that the program may be installed in advance in the ROM or another memory medium, may be supplied in the state of being stored in the computer readable memory medium, may be distributed by a wired or wireless communication device, or the like. Examples of the computer readable memory medium include a magnetic disk, a magneto-optical disk, a CD-ROM, a DVD-ROM, and a semiconductor memory.

When a rectification system using the rectifier 10 is adopted, all of the AC power collecting systems 40 connected to the respective wind turbine generators 30 are typically operated in the same phase. In this case, it has been found that the ripple is increased.

Then, in the present embodiment, the power supply sets 200 are grouped into at least two groups 90, so that the AC power collecting systems 40 belonging to the respective groups 90 are operated with equally spaced phase difference with respect to each other.

Figure 4:
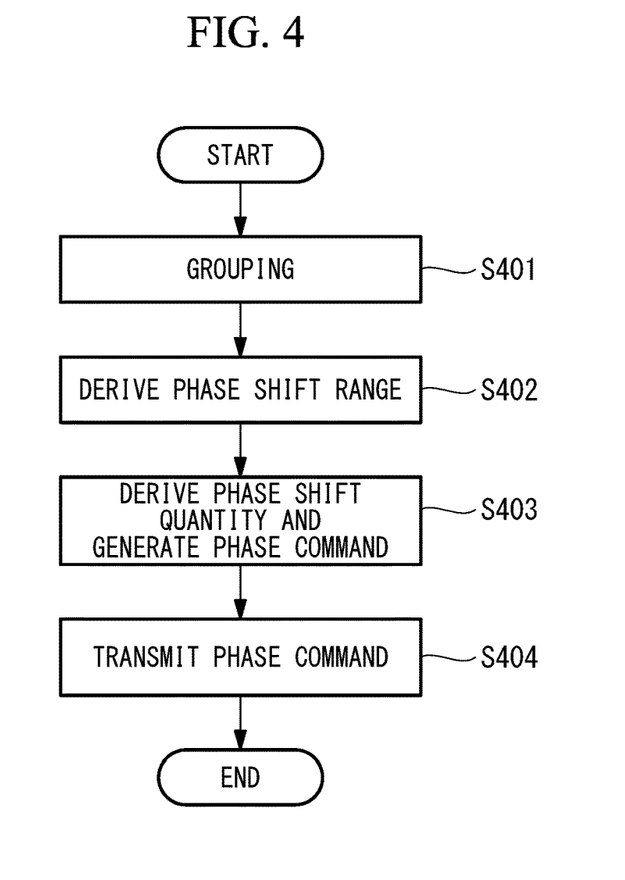
FIG. 4 is a flowchart of a phase command control of the control device of the distributed power supply system according to the first embodiment of the present invention.

FIG. 4 illustrates a flowchart of a phase command control of the control device of the distributed power supply system according to the present embodiment.

The grouping section 51 of the control device 50 groups the power supply sets 200 into the predetermined number of groups 90 (S401). In the present embodiment, the grouping section 51 groups the power supply sets 200 into two groups 90X and 90Y.

As the difference in the total power outputs from the wind turbine generators 30 belonging to the group 90X and the wind turbine generators 30 belonging to the group 90Y is smaller, the higher harmonic components included in the high voltage direct current are reduced. The grouping section 51 groups the power supply sets 200 so that a difference in total power outputs from the wind turbine generators 30 between the groups 90 is minimized.

In the present embodiment, as illustrated in FIG. 1, the grouping section 51 groups the power supply sets 200 into two groups 90, so that the power supply sets 200A and 200B belong to the group 90X, and the power supply set group 200C belongs to the group 90Y.

FIG. 1 illustrates, as an example, the case where the power supply sets 200 are grouped into two groups 90X and 90Y, but the number of groups 90 may be any number equal to or greater than two.

In the following descriptions, when the groups 90 are distinguished from each other, the reference numeral is suffixed with a letter "X" or "Y," and when the groups 90 are not distinguished, the letter "X" or "Y" is omitted.

The phase command generation section 52 of the control device 50 derives the phase shift range based on the number of pulses of the rectifier 10 to generate the phase command (S402).

When the rectifier 10 is a 12-pulse rectifier, the number of pulses of the rectifier 10 is 12, and the pulse period in one rectifier 10 is 30° when considered with the fundamental waveform as a reference. Accordingly, the phase shift range which is a range of the phase shift quantity is derived as 0° to 30°.

The phase command generation section 52 drives the phase shift quantity of each group based on the phase shift range and the number of groups 90, to generate the phase command (S403). The phase command is provided as a lag or lead from the reference time.

The phase shift quantity is expressed by the following equation (1).

$$(\text{Phase shift quantity}) = (\text{Phase shift range}) / (\text{the number of groups}) \quad (1)$$

In the present embodiment, the phase shift range is 30°, the number of groups 90 is two. Specifically, since the phase is divided by two, the phase shift quantity of the group 90Y is determined as 15° from the equation (1) when the phase shift quantity of the group 90X is 0°.

Accordingly, the phase command generation section 52 generates a phase command of 0° for the plurality of wind turbine generators 30A of the power supply group 200A and the plurality of wind turbine generators 30B of the power supply group 200B which belong to the group 90X, and generates a phase command of 15° for the plurality of wind turbine generators 30C of the power supply group 200C which belongs to the group 90Y.

The transmission section 53 of the control device 50 transmits the phase commands generated in step S403 to the corresponding wind turbine generators 30 (S404).

The transmission section 53 transmits the above-described phase command of 0° to all of the wind turbine generators 30A and the wind turbine generators 30B in the group 90X, and the phase command of 15° to all of the wind turbine generators 30C in the group 90Y. Thus, all of the wind turbine generators 30 in the group 90X and all of the wind turbine generators 30 in the group 90Y are operated with equally spaced phase difference of 15° with respect to each other.

The reference time of the wind turbine which is the phase reference may be acquired using a GPS (Global Positioning System), may be the timing broadcasted from the offshore transformer substation 100, or may be acquired using various methods. Any method of acquiring the reference time can be used.

Figure 5:
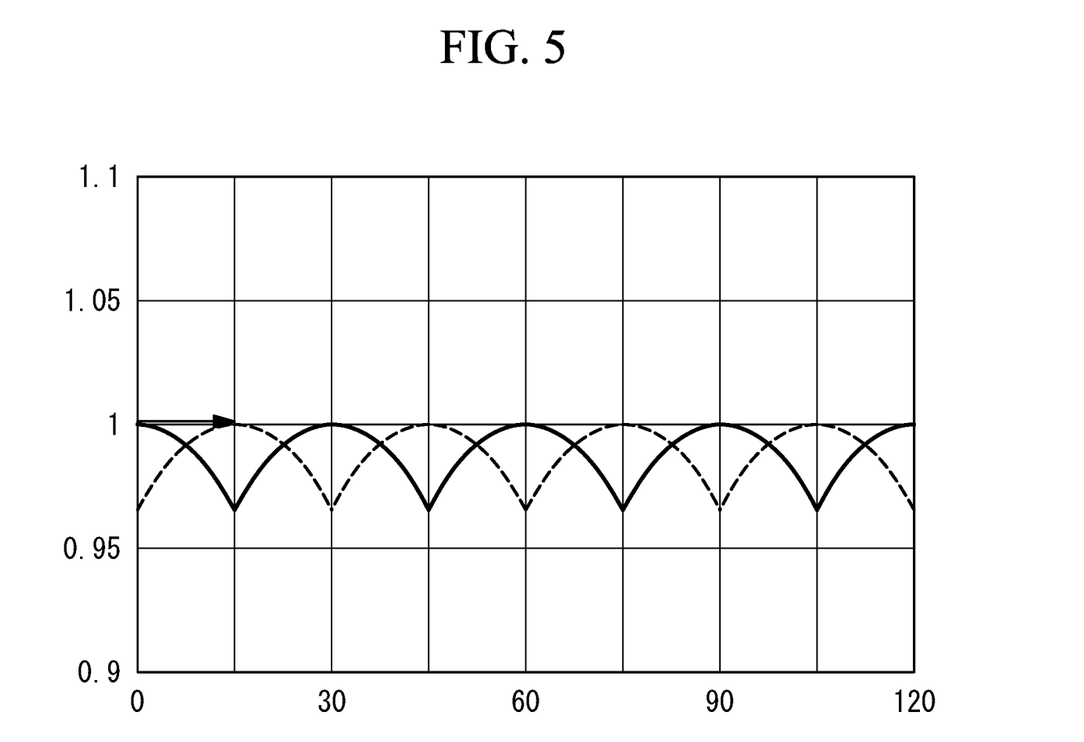
FIG. 5 is a graph showing a phase of a ripple of a high voltage direct current of the distributed power supply system according to the first embodiment of the present invention.

FIG. 5 is a graph showing a phase of a ripple of the high voltage direct current of the distributed power supply system according to the present embodiment.

The vertical axis of FIG. 5 represents a voltage, and the horizontal axis represents a phase. The solid line in FIG. 5 shows a phase of the ripple of the high voltage direct current in the group 90X, and the dotted line shows a phase of the ripple of the high voltage direct current in the group 90Y.

As shown in FIG. 5, the phases of the group 90X and the group 90Y have a period of 30°. The phase of the group 90Y is shifted by 15° with respect to the phase of the group 90X, so that a phase difference between the group 90X and the 90Y is 15°. In this way, the ripples of the high voltage direct currents cancel each other out.

The rectifier 10 is a 12-pulse rectifier, but the phases are controlled as described above, and the number of groups 90 is two, resulting that it is possible to obtain the higher harmonic reduction effect which is equivalent to that in case of applying a 24-pulse rectifier. Under ideal conditions, the higher harmonic component can be reduced to about ½.

Figure 6:
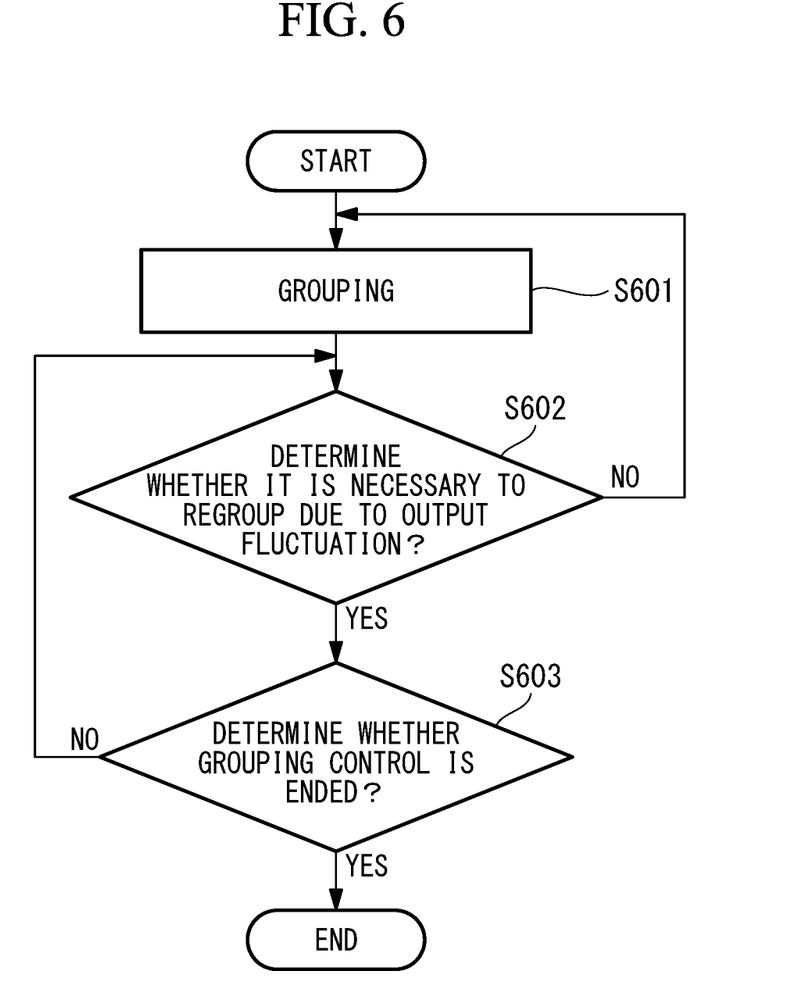
FIG. 6 is a flowchart of a grouping control of the control device of the distributed power supply system according to the first embodiment of the present invention.

FIG. 6 illustrates a flowchart of a grouping control of the control device of the distributed power supply system according to the present embodiment.

The distributed power supply utilizes the natural energy, and in the present embodiment, the wind turbine generator 30 utilizes the wind power, so that the output of the distributed power supply (wind turbine generator 30) constantly fluctuates. Since the grouping section 51 of the control device 50 groups the wind turbine generators 30 so that a difference in total power outputs from the wind turbine generators 30 between the groups 90 is minimized, when the outputs of the wind turbine generators 30 fluctuate, it is necessary to regroup the wind turbine generators 30 to minimize the difference in total power outputs from the wind turbine generators 30 between the groups 90.

In step S601, the grouping section 51 groups the power supply sets 200 into the predetermined number of groups 90 to minimize the difference in total power outputs from the wind turbine generators 30 between the groups 90.

The grouping section 51 determines whether it is necessary to regroup the power supply sets 200 when the output from each group 90 fluctuates (S602). This determination may be performed at various timings such as at a predetermined time interval, or at a timing when the magnitude of variation in output for each group 90 exceeds a predetermined threshold, but it does not matter what timing is used for the above-described determination. Determining whether the regrouping is necessary is performed by determining whether an output difference between the groups is equal to or greater than a predetermined voltage.

When in step S602, the grouping section 51 determines that the output from each group 90 fluctuates and it is necessary to regroup the power supply sets 200, the process returns to step S601, and the grouping section 51 regroups the power supply sets 200 into the predetermined number of groups 90 to minimize the difference in total power outputs from the wind turbine generators 30 between the groups 90.

When in step S602, the grouping section 51 determines that the regrouping is not necessary, the process proceeds to step S603.

In step S603, the grouping section 51 determines whether the grouping control is ended.

When in step S603, the grouping section 51 determines that the grouping control is ended, the grouping control is ended.

When in step S603, the grouping section 51 determines that the grouping control is not ended, the process proceeds to step S602.

The grouping section 51 performs the above-described processes to perform the grouping control to balance the power outputs between the groups 90.

As described above, according to a control device for a distributed power supply system, the distributed power supply system, a control method for the distributed power supply system, and a control program of the distributed power supply system according to the present embodiment, the following operation and effect can be achieved.

According to the present embodiment, the grouping section 51 groups the plurality of power supply sets 200 including at least one wind turbine generator 30 into at least two groups 90, the phase command generation section 52 generates phase commands different from one another for each group 90, and generates the same phase command to output to the power supply sets 200 belonging to the same group 90, and the transmission section 53 transmits the phase command to the wind turbine generator 30 in the power supply set 200.

The ripples of the high voltage direct current sides of the rectifiers 10 cancel each other out. According to the present embodiment, when the grouping section 51 groups the power supply sets 200 into two groups 90, for example, it is possible to obtain the higher harmonic reduction effect which is equivalent to that in case of using a rectifier 10 the number of pulses of which is twice the number of pulses of the rectifier 10 used in the present embodiment. According to the present embodiment, the capacity of the DC filter 18 can be reduced even when it is necessary to use the large DC filter 18 to reduce the ripple. As the number of pulses of the rectifier 10 is increased, the rectifier 10 becomes typically more expensive, and the combination with the voltage converter 11 is also complicated. According to the present embodiment, making the phase difference by providing phase commands different from one another enables the effect which is equivalent to that of the rectifier with large number of pulses to be obtained at low cost without replacing the rectifier 10.

The rectifier 10 is used without using a self-excited or separately excited power converter such as a transistor, thereby achieving the inexpensive power transmission. Particularly, a significant effect is achieved in the long distance transmission which advantageously enables the power transmission in a high voltage DC system. Using the rectifier 10 may cause an increase in the size of the DC filter 18 for reducing the ripple. According to the present embodiment, the ripples cancel each other out, thereby allowing the capacity and cost of the DC filter 18 to be reduced.

The capacity of the DC filter 18 depends on the ripple frequency. According to the present embodiment, the transmission section 53 transmits the frequency setting command so that a frequency of the AC power of the wind turbine generator 30 is set to a frequency (for example, 400 Hz) higher than 50 Hz or 60 Hz, which is a general commercial frequency. The capacity of the DC filter 18 decreases in inverse proportion to an increase in frequency of the ripple, thereby allowing the capacity of the DC filter 18 to be further reduced.

According to the present embodiment, the phase command generation section 52 of the control device 50 generates phase commands based on the pulse period in the rectifier 10 and the number of groups 90 of power supply sets 200. In this way, the distributed power supply system 1 may have a phase difference capable of obtaining the highest ripple reduction effect.

In the distributed power supply system 1, the higher harmonic components are minimized when the total power output from the plurality of wind turbine generators 30 belonging to the group 90 becomes equal to that from the plurality of wind turbine generators 30 belonging to the other groups 90.

According to the present embodiment, the grouping section 51 groups the power supply sets 200 into the groups 90 to minimize the difference in total power outputs from the wind turbine generators 30 between the groups 90. The grouping section 51 groups the power supply sets 200 to minimize the higher harmonic components, thereby capable of maximizing the effect achieved by the phase difference.

According to the present embodiment, the grouping section 51 regroups the power supply groups 200 to minimize the difference in total power outputs from the wind turbine generators 30 between the groups 90 when the total power output from the wind turbine generators 30 for each group 90 fluctuates. The total power outputs can be balanced between the groups 90, and the power transmission can be performed without impairing the effect achieved by the phase difference.

Second Embodiment

Hereinafter, a second embodiment of the present invention will be described with reference to FIG. 7.

In the above-described first embodiment, the AC power collecting systems are operated with equally spaced phase difference with respect to each other, and in the present embodiment, the frequency of the AC power collecting system is further increased. Since the rest of the configuration is the same as that in the first embodiment, the same reference numerals are assigned to the similar components, and redundant descriptions of the components are omitted.

Figure 7:
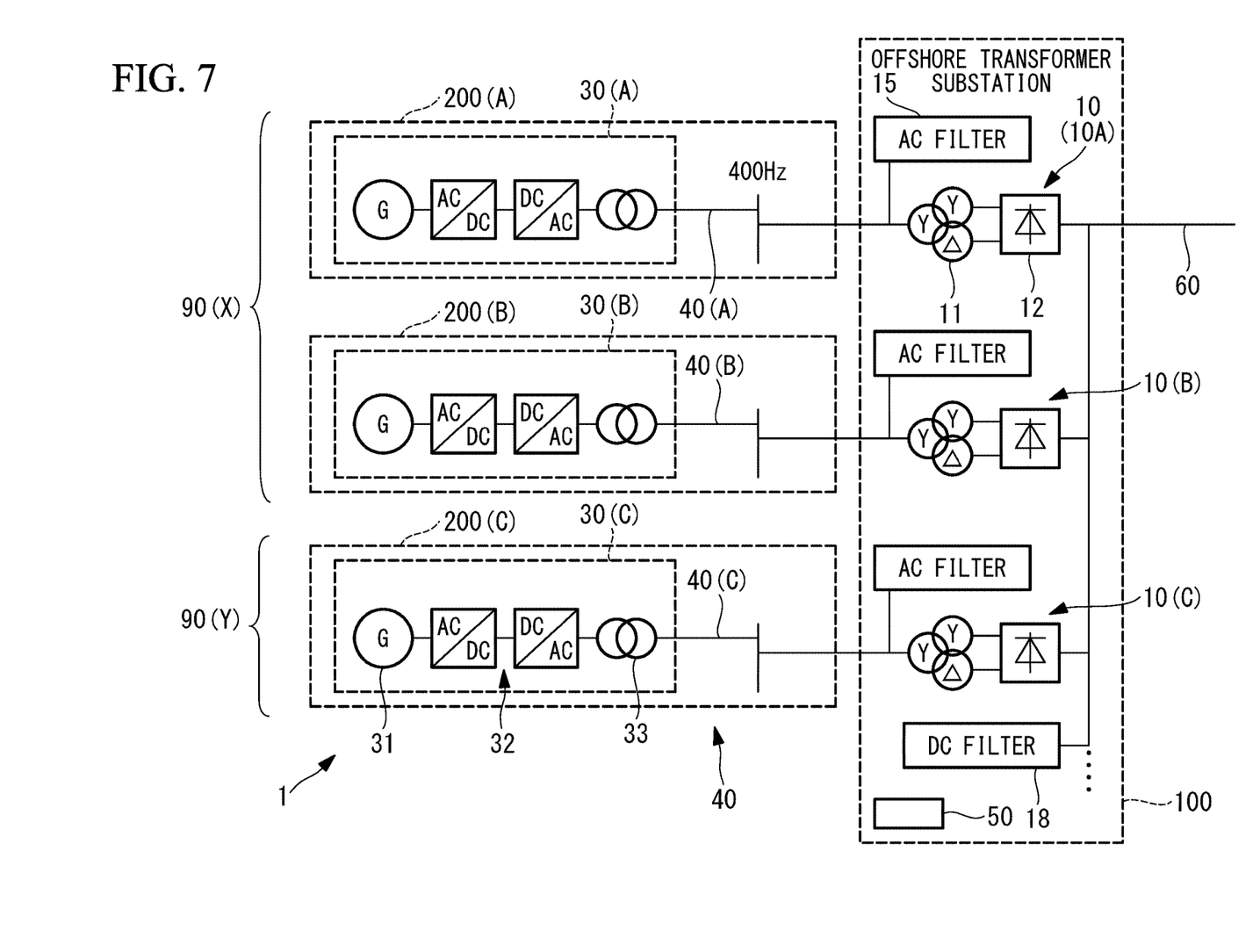
FIG. 7 is a schematic configuration diagram illustrating of a distributed power supply system according to a second embodiment of the present invention.

FIG. 7 is a schematic configuration diagram illustrating of a distributed power supply system according to the present embodiment. The AC power collecting system 40 in the distributed power supply system 1 using the rectifier 10 is typically operated at 50 Hz or 60 Hz which is a commercial frequency.

The capacity of the DC filter 18 in the offshore transformer substation 100 depends on the ripple frequency, and the required capacity of the DC filter 18 decreases as the ripple frequency increases. This is because the period of the ripple is reduced as the ripple frequency increases.

In the present embodiment, in the distributed power supply system 1 of the first embodiment, the AC power collecting system 40 is operated at a frequency higher than the commercial frequency. Specifically, the transmission section 53 of the control device 50 transmits the frequency setting command so that the wind turbine generator 30 is operated at a frequency higher than the commercial frequency. The frequency higher than the commercial frequency is, for example, 400 Hz. The frequency of the AC power collecting system 40 is increased, resulting in the frequency of the ripple being increased.

As described above, according to a control device for a distributed power supply system, the distributed power supply system, a control method for the distributed power supply system, and a control program of the distributed power supply system according to the present embodiment, the following operation and effect can be achieved.

The capacity of the DC filter 18 depends on the ripple frequency. According to the present embodiment, the transmission section 53 transmits the frequency setting command so that the AC power collecting system 40 of the wind turbine generator 30 is operated at a frequency (for example, 400 Hz) higher than 50 Hz or 60 Hz, which is a general commercial frequency. The capacity of the DC filter 18 decreases in inverse proportion to an increase in frequency of the ripple. According to the second embodiment, the capacity of the DC filter 18 can be further reduced as compared to only a case where the phase difference is made in the first embodiment.

Hereinabove, while the embodiments of the present invention have been described in detail with reference to the drawings, specific configurations are not limited to these embodiments, but may include design changes without departing from the scope of the present invention.

For example, the number of power supply sets 200 including in the groups 90, and the number of wind turbine generators 30 included in the power supply set 200 may be one or more.

The reactor may be connected in series to the DC system 60 after obtaining the reactance in advance. In this way, both of the inductance and the capacitance can be reduced.

REFERENCE SIGNS LIST

1 Distributer power supply system
10 Rectifier
18 DC filter
30, 30A, 30B, 30C Wind turbine generator (distributed power supply)
40, 40A, 40B, 40C AC power collecting system
50 Control device
51 Grouping section (grouping device)
52 Phase command generation section (phase command generation device)
53 Transmission section (transmission device)
60 DC system
90, 90X, 90Y Group
100 Offshore transformer substation
200, 200A, 200B, 200C Power supply set

What is claimed is:

1. A control device of a distributed power supply system which includes a plurality of power supply sets having at least one distributed power supply, and a rectifier which is provided corresponding to each of the power supply sets, and configured to rectify AC power of the distributed power supply to DC power, so that the DC power rectified by the rectifier is collected to transmit electric power,
the control device comprising:
a grouping device configured to group the plurality of power supply sets into at least two groups so that at least one group includes the plurality of power supply sets;
a phase command generation device configured to generate phase commands different from one another for each group to output to the power supply sets belonging to the respective groups, and generate the same phase command to output to the distributed power supplies in the power supply sets belonging to the same group;
a transmission device configured to transmit the phase command generated by the phase command generation device to the distributed power supplies of the power supply sets; and
a filter configured to reduce a ripple included in the DC power rectified by the rectifier,
wherein the grouping device is configured to group the power supply sets to minimize a difference in total power outputs from the distributed power supplies between the groups.

2. The control device according to claim 1, wherein the transmission device is configured to transmit a frequency setting command to the distributed power supply so that the distributed power supply is operated at a frequency higher than a commercial frequency.

3. The control device according to claim 1, wherein the phase command generation device is configured to generate the phase command based on the number of phases of the rectifier and the number of groups.

4. The control device according to claim 1, wherein the grouping device is configured to change the groups so that the difference in total power outputs from the distributed power supplies between the groups is minimized, when the total power output from the distributed power supplies for each group fluctuates.

5. A distributed power supply system, comprising:
a plurality of power supply sets having at least one distributed power supply; and
a rectifier configured to be provided corresponding to each of the power supply sets and configured to rectify AC power of the distributed power supply to DC power; and
the control device according to claim 1.

6. The control device according to claim 1, wherein the filter is provided in parallel to the rectifier.

7. A control method for a distributed power supply system which includes: a plurality of power supply sets having at least one distributed power supply; and a rectifier which is provided corresponding to each of the power supply sets, and configured to rectify AC power of the distributed power supply to DC power, so that the DC power rectified by the rectifier is collected to transmit electric power,
the control method comprising:

a grouping step of grouping the plurality of power supply sets into at least two groups so that at least one group includes the plurality of power supply sets;

a phase command generation step of generating phase commands different from one another for each group to output to the distributed power supplies in the power supply sets belonging to the respective groups, and generating the same phase command to output to the power supply sets groups belonging to the same group;

a transmission step of transmitting the phase command generated by the phase command generation step to the distributed power supplies of the power supply sets; and reducing, with a filter, a ripple included in the DC power rectified by the rectifier, wherein grouping of the power supply sets is performed to minimize a difference in total power outputs from the distributed power supplies between the groups.

8. A control program of a distributed power supply system which includes: a plurality of power supply sets having at least one distributed power supply; and a rectifier which is provided corresponding to each of the power supply sets, and configured to rectify AC power of the distributed power supply to DC power, so that the DC power rectified by the rectifier is collected to transmit electric power, the control program comprising:

a grouping step of grouping the plurality of power supply sets into at least two groups so that at least one group includes the plurality of power supply sets;

a phase command generation step of generating phase commands different from one another for each group to output to the power supply sets belonging to the respective groups, and generating the same phase command to output to the distributed power supplies in the power supply sets belonging to the same group;

a transmission step of transmitting the phase command generated by the phase command generation step to the distributed power supplies of the power supply sets; and reducing, with a filter, a ripple included in the DC power rectified by the rectifier, wherein grouping of the power supply sets is performed to minimize a difference in total power outputs from the distributed power supplies between the groups.

9. The control method according to claim 7, wherein the filter is provided in parallel to the rectifier.

10. The control program according to claim 8, wherein the filter is provided in parallel to the rectifier.

* * * * *

UNITED STATES PATENT AND TRADEMARK OFFICE
CERTIFICATE OF CORRECTION

| | | |
|---|---|---|
| PATENT NO. | : 11,223,209 B2 | Page 1 of 1 |
| APPLICATION NO. | : 16/104489 | |
| DATED | : January 11, 2022 | |
| INVENTOR(S) | : Maruyama | |

It is certified that error appears in the above-identified patent and that said Letters Patent is hereby corrected as shown below:

On the Title Page

In item (54) and in the Specification Column 1 Lines 1-5, change the title from "CONTROL DEVICE FOR DISTRIBUTED POWER SUPPLY SYSTEM, DISTRIBUTED POWER SUPPLY SYSTEM, AND CONTROL PROGRAM OF DISTRIBUTED POWER SUPPLY SYSTEM" to --CONTROL DEVICE FOR DISTRIBUTED POWER SUPPLY SYSTEM, DISTRIBUTED POWER SUPPLY SYSTEM, CONTROL METHOD FOR DISTRIBUTED POWER SUPPLY SYSTEM, AND CONTROL PROGRAM OF DISTRIBUTED POWER SUPPLY SYSTEM--.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*